United States Patent
Morishita et al.

(10) Patent No.: US 8,968,932 B2
(45) Date of Patent: Mar. 3, 2015

(54) COBALT CERIUM COMPOUND, ALKALINE SECONDARY BATTERY, AND METHOD FOR PRODUCING COBALT CERIUM COMPOUND

(75) Inventors: Masanori Morishita, Kyoto (JP); Tadashi Kakeya, Kyoto (JP); Seijiro Ochiai, Kyoto (JP); Aki Nakashima, Kyoto (JP); Yoshiteru Kawabe, Kyoto (JP); Tetsuo Sakai, Osaka (JP)

(73) Assignees: GS Yuasa International Ltd., Kyoto-Shi, Kyoto (JP); National Institute of Advanced Industrial Science and Technology, Tokyo (JP)

( * ) Notice: Subject to any disclaimer, the term of this patent is extended or adjusted under 35 U.S.C. 154(b) by 133 days.

(21) Appl. No.: 13/383,824

(22) PCT Filed: Jul. 16, 2010

(86) PCT No.: PCT/JP2010/062040
§ 371 (c)(1),
(2), (4) Date: Jan. 12, 2012

(87) PCT Pub. No.: WO2011/007858
PCT Pub. Date: Jan. 20, 2011

(65) Prior Publication Data
US 2012/0115034 A1    May 10, 2012

(30) Foreign Application Priority Data
Jul. 17, 2009    (JP) .................. 2009-168655

(51) Int. Cl.
*H01M 4/131*    (2010.01)
*H01M 4/62*    (2006.01)
(Continued)

(52) U.S. Cl.
CPC ............. *H01M 4/624* (2013.01); *C01G 51/006* (2013.01); *C01G 51/40* (2013.01); *H01M 4/626* (2013.01);
(Continued)

(58) Field of Classification Search
USPC .................... 429/232, 231.3, 219, 231.95
See application file for complete search history.

(56) References Cited

U.S. PATENT DOCUMENTS 5,993,995 A * 11/1999 Bernard et al. .............. 429/223
6,156,455 A * 12/2000 Yamamura et al. ........... 429/223
(Continued)

FOREIGN PATENT DOCUMENTS

JP    10-050308 A    2/1998
JP    2001-332257 A    11/2001
(Continued)

OTHER PUBLICATIONS

Klm et al. "Cobalt and cerium coated Ni powder as a new candidate cathode material for MCFC" Electrochimica Acta 51 published in 2006 pp. 6145-6151.*
(Continued)

*Primary Examiner* — Mark F Huff
*Assistant Examiner* — Olatunji Godo
(74) *Attorney, Agent, or Firm* — McGinn IP Law Group, PLLC

(57) ABSTRACT

A compound having a high reduction resistance and being capable of sufficiently performing a function as an electronic conductive additive when added to a positive electrode active material as an electronic conductive additive is provided. In a method for producing a cobalt cerium compound including a step of depositing a hydroxide containing cobalt and cerium in an aqueous solution containing cobalt ions and cerium ions by changing the pH of the aqueous solution and thereafter performing a treatment of oxidizing the hydroxide, the ratio of the cerium ions contained in the aqueous solution containing the cobalt ions and the cerium ions is set to be more than 5% by atom and 70% by atom or less with respect to the sum of the cobalt ions and the cerium ions before the hydroxide is deposited.

6 Claims, 7 Drawing Sheets

(51) Int. Cl.
  *C01G 51/00* (2006.01)
  *C01G 53/00* (2006.01)
  *H01M 10/24* (2006.01)

(52) U.S. Cl.
  CPC ........... *C01G 53/006* (2013.01); *C01P 2002/52* (2013.01); *C01P 2002/76* (2013.01); *C01P 2004/80* (2013.01); *C01P 2006/12* (2013.01); *C01P 2006/40* (2013.01); *H01M 10/24* (2013.01)
  USPC .................. 429/231.3; 429/232; 429/231.95; 429/219

(56) References Cited

U.S. PATENT DOCUMENTS

| | | | |
|---|---|---|---|
| 6,287,726 | B1 | 9/2001 | Ohta et al. |
| 2004/0175615 | A1 | 9/2004 | Ovshinsky et al. |
| 2006/0154071 | A1* | 7/2006 | Homma et al. ............... 428/403 |
| 2007/0154561 | A1 | 7/2007 | Takeda et al. |
| 2009/0123851 | A1* | 5/2009 | Soma et al. ................. 429/342 |
| 2009/0239144 | A1 | 9/2009 | Izumi et al. |

FOREIGN PATENT DOCUMENTS

| | | |
|---|---|---|
| JP | 2002-160920 A | 6/2002 |
| JP | 2003-017046 A | 1/2003 |
| JP | 2005-263612 A | 9/2005 |

OTHER PUBLICATIONS

H. Pan et al. "An electrochemical study of $La_{0.4}Ce_{0.3}Mg_{0.3}Ni_{2.975-x}Mn_xCo_{0.525}$ (x=0.1-0.4) hydrogen storage alloys" Journal of Alloys and Compounds 376 published in 2004 pp. 196-204.*

G.D. Adzic et al. Cerium Content and Cycle Life of Multicomponent ABs Hydride Electrodes (J. Electrochem. Soc., vol. 142, No. 10 Oct. 1995).*

International Search Report in PCT/JP2010/062040 dated Aug. 24, 2010 (English Translation Thereof).

L.F. Liotta, et al., "$CO_3O_4/CeO_2$ composite oxides for methane emissions abatement: Relationship between $CO_3O_4$—$CeO_2$ interaction and catalytic activity", Applied Catalysis B: Environmental, Jul. 20, 2006, vol. 66, Nos. 3-4, pp. 217-227.

Wang et al., "Surface behavior of pasted nickel electrodes with electrodeposited Co—Ce on substrate". Trans, Nonferrous met, Soc., China 16(2006) 1148-1153.

* cited by examiner

COBALT CERIUM COMPOUND, ALKALINE SECONDARY BATTERY, AND METHOD FOR PRODUCING COBALT CERIUM COMPOUND

TECHNICAL FIELD

The present invention relates to a cobalt cerium compound, an alkaline secondary battery using the cobalt cerium compound, and a method for producing a cobalt cerium compound.

BACKGROUND ART

Application of the aforementioned cobalt cerium compound to various uses that need a cobalt compound having a low resistance is considered. Hereafter, in particular, a case of using in a positive electrode for an alkaline secondary battery will be described.

In recent years, a non-sintered type electrode in which a nickel substrate (nickel foamed substrate) is filled with a paste-like active material is used as a nickel electrode that constitutes a positive electrode of an alkaline secondary battery such as a nickel metal hydride battery, a nickel cadmium battery, or a nickel zinc battery.

Also, with the constitution of a non-sintered type electrode in which a nickel foamed substrate is simply filled with an active material, the electric conductivity decreases in accordance with discharging of the battery, so that a region that does not function effectively as a positive electrode of the battery will be present in not a small amount within the nickel foamed substrate. For this reason, a technique of using cobalt oxyhydroxide which is a cobalt compound having a high electric conductivity is considered.

However, it is now coming to be understood that, when only cobalt oxyhydroxide is used as an electronic conductive additive, there are cases in which an object of improving the electric conductivity is not sufficiently fulfilled.

Specifically, in a case such as when the alkaline secondary battery comes into an over-discharged state to let the positive electrode potential come close to the negative electrode potential or when a state of reverse charging is brought about, the cobalt oxyhydroxide is reduced to decrease the valence number of cobalt and, in accordance therewith, the electric conductivity decreases. Furthermore, when reduced to change into cobalt hydroxide ($Co(OH)_2$), the cobalt oxyhydroxide is dissolved into an electrolyte solution and will no longer function as an electronic conductive additive.

Under such a circumstance, an attempt for restraining the reduction of cobalt oxyhydroxide is also made.

For example, the following Patent Document 1 proposes a construction of adding antimony or the like to an oxidized compound of cobalt.

PRIOR ART DOCUMENTS

Patent Documents

Patent Document 1: Japanese Patent Laid-open Publication No. 10-50308

SUMMARY OF THE INVENTION

Problems to be Solved by the Invention

However, though the above Patent Document 1 enumerates a lot of materials to be added to an oxidized compound of cobalt, those that have been actually evaluated on the basis of experiment data are limited to only an extremely small part of magnesium or aluminum. Also, regarding the evaluation thereof, only the change in the battery capacity is measured, so that it is not sufficient as an evaluation. Furthermore, regarding an added material on which an evaluation based on experiment data is not made, it is not possible to conjecture what kind of characteristics the material can have.

The present invention has been made in view of the above circumstances, and an object thereof is to provide a compound having a high reduction resistance and being capable of sufficiently performing a function as an electronic conductive additive when added to a positive electrode active material as an electronic conductive additive.

Solutions to the Problems

The inventors of the present invention have found out that, when cerium (Ce) is adopted as a material to be added to a cobalt compound constituting an electronic conductive additive, unique characteristics completely different from those in a case in which other materials are added are exhibited.

Hereafter, description will be give by way of experiment examples. In the experiments, specific resistance of the prepared cobalt cerium compounds was measured by using the powder resistance measuring method, and also the liability of occurrence of the reduction reaction of the cobalt cerium pounds was measured by using the experiment apparatus shown in FIG. 5, and the usefulness in the case of using the cobalt cerium compounds as an electronic conductive additive was evaluated on the basis of the result thereof.

The experiment apparatus shown in FIG. 5 is constructed in such a manner that a working electrode 101, a reference electrode 102, and a counter electrode 103 are disposed in an electrolyte solution, and the potential of the working electrode 101 can be set by a control apparatus 104 using the reference electrode 102 as a standard.

The working electrode 101 is one such that foamed nickel is filled with a cobalt cerium compound, and the reference electrode 102 is constructed with Hg/HgO. Also, the counter electrode 103 is constructed with a hydrogen absorption alloy electrode similar to the negative electrode of a typical nickel hydrogen battery, and these are disposed in a 6.8 mol/liter aqueous solution of potassium hydroxide constituting the electrolyte solution.

When the potential of the working electrode 101 is set to be −1 V (which is almost equal to the potential of the counter electrode 103), at which the cobalt cerium compound is likely to bring about reduction reaction, by the control apparatus 104 using the reference electrode 102 as a standard, the current generated by the reduction reaction is measured. Then, the liability of occurrence of the reduction reaction can be quantitatively evaluated by an accumulated value of the current caused to flow by the reduction reaction.

A cobalt cerium compound constituting a sample was prepared by the following procedure. First, a cobalt compound and a cerium compound were dissolved to produce an aqueous solution brought into a state of containing cobalt ions and cerium ions, and the pH was adjusted by dropwise adding the aqueous solution into an aqueous solution of sodium hydroxide with adjusted pH. Next, the hydroxide containing cobalt and cerium was deposited in the aqueous solution, and the hydroxide was subjected to an oxidation treatment, that is, a heating treatment in the presence of oxygen, for preparation.

The above measurement was carried out on a plurality of cobalt cerium compounds prepared by changing the abundance ratio of the cobalt ions and the cerium ions in the above aqueous solution.

A working electrode 101 filled with the cobalt cerium compound prepared in this manner was prepared by the following method. First, the prepared cobalt cerium compound and carboxymethylcellulose (CMC) were added and mixed to produce an aqueous solution having a concentration of 1 wt %, and then 40 wt % of polytetrafluoroethylene (PTFE) was mixed. The ratio at this time is cobalt cerium compound PTFE (solid components)=97:3.

A foamed nickel base plate having a thickness of 1.4 mm and a surface density of 450 g/m$^2$ was filled with the positive electrode paste and subjected to rolling after being dried to produce an original plate. The original plate was cut to a dimension of 2 cm×2 cm, and a tab for collecting electricity was attached to produce the working electrode 101. The amount of the cobalt cerium compound calculated from the filling amount of the electrode plate was 0.2 g.

Further, the inventors of the present invention performed a detailed analysis of the crystal structure thereof in order to evaluate the prepared cobalt cerium compound in a more precise manner.

A measurement result by an X-ray diffraction apparatus was analyzed by the Rietvelt method to analyze the crystal structure. The crystal structure in the sample powder was identified, and also the abundance ratio of the phase having the identified crystal structure was identified. The X-ray diffraction apparatus is the product number M06XCE manufactured by Bruker AXS Co., Ltd., and the measurement condition is 40 kV, 100 mA (Cu tube bulb). As an analyzing software of the Rietvelt method, RIETAN2000 was used. The specific resistance value is a value obtained by the powder resistance measuring method and was measured in a state of being pressurized at 10 MPa after 50 mg of the sample powder was put into a circular template having a radius of 4 mm. From this measurement result, the specific resistance value (reciprocal of the electric conductivity) of the sample powder can be obtained. These measurement results are shown in Table 1.

ing a crystal structure of rhombohedron structure and space group R3m structure (hereafter simply referred to as "cobalt oxyhydroxide phase") and a cerium dioxide phase having a crystal structure of fluorite structure and space group Fm3m structure (hereafter simply referred to as "cerium dioxide phase") as major components, and also a little amount of tricobalt tetraoxide crystal phase depending on the condition for preparing the cobalt cerium compound.

Among these crystal phases, an analysis result of analyzing the important crystal structures of the cobalt oxyhydroxide phase and the cerium dioxide phase by the Rietvelt analysis will be described in further details.

As shown by the crystal structure model of FIG. 6, the cobalt oxyhydroxide phase has a crystal structure of rhombohedron structure and space group R3m structure, and contains at least cobalt atoms, oxygen atoms, and hydrogen atoms as constituent elements. Further, in the cobalt cerium compound of the present invention, the cobalt oxyhydroxide phase can contain cerium atoms.

These atoms are disposed at predetermined sites shown in FIG. 6. Specifically, Co or Ce is disposed at 3a1, 3a2 sites, and oxygen atoms (including the oxygen atoms constituting water molecules and hydroxide ions) are disposed at 3a3, 9b sites.

When cerium is contained in this manner, Ce is disposed at 3a1, 3a2 sites. Here, an atom may not be disposed at 3a4 site; however, Na is preferably disposed at the site as shown in FIG. 6. The disposal of Na at 3a4 site can be carried out by allowing sodium hydroxide to coexist when a hydroxide containing cobalt and cerium is subjected to a heating treatment as described later. When Na is contained in this manner, oxidation can be made to proceed easily in the oxidation treatment in the production process.

As shown by the crystal structure model of FIG. 7, the cerium dioxide phase has a crystal structure of fluorite structure and space group Fm3m structure, and contains at least cerium atoms and oxygen atoms as constituent elements.

TABLE 1

| Content ratio of cerium (% by atom) | Specific resistance value (Ω cm) | Reduction current amount (mAh) | Content ratio of crystal phase (% by mass) | | | Abundance ratio of cerium dioxide phase (% by mass) |
|---|---|---|---|---|---|---|
| | | | Cobalt oxyhydroxide phase | Cerium dioxide phase | Tricobalt tetraoxide phase | |
| 0 | 6.6 | 21.8 | 100.00 | 0.00 | 0.00 | 0.0 |
| 1 | 11.1 | 9.0 | — | — | — | — |
| 5 | 4.2 | 7.7 | 91.27 | 6.36 | 2.37 | 6.5 |
| 10 | 6.4 | 3.7 | 84.96 | 13.19 | 1.84 | 13.4 |
| 30 | 2.8 | 2.3 | 56.60 | 37.74 | 5.66 | 40.0 |
| 40 | 6.2 | 2.3 | 51.42 | 48.59 | 0.00 | 48.6 |
| 50 | 29.9 | 1.5 | — | — | — | — |
| 70 | 34.5 | 1.7 | 11.76 | 88.24 | 0.00 | 88.2 |

In Table 1, the "content ratio of cerium" is a content ratio (% by atom) of the cerium ions with respect to the sum of the cobalt ions and the cerium ions in an aqueous solution containing the cobalt ions and the cerium ions in the process of producing a cobalt cerium compound.

The "reduction current amount" is a current as measured by using the experiment apparatus shown in FIG. 5, and is a result of measuring the accumulated current amount for one hour. Therefore, the numerical value represents the average current value for one hour.

As a result of analyzing the crystal structure of the cobalt cerium compound, it has been found out that the cobalt cerium compound contains a cobalt oxyhydroxide phase hav- Further, in the cobalt cerium compound of the present invention, the cerium dioxide phase can contain cobalt atoms. These atoms are disposed at predetermined sites shown in FIG. 7. Specifically, Co or Ce is disposed at 4a site, and oxygen atoms are disposed at 8c site.

In this manner, when cobalt is contained in the above-described cerium dioxide phase, cobalt replaces a part of cerium.

Table 1 shows the content ratio (% by mass) of each phase of the above-described cobalt oxyhydroxide phase, cerium dioxide phase, and tricobalt tetraoxide crystal phase in the cobalt cerium compound.

Further, the "abundance ratio of cerium dioxide phase" shown in the right end column of Table 1 is one obtained by calculating the abundance ratio of the cerium dioxide phase in the cobalt cerium compound as a ratio relative to the sum of the cobalt oxyhydroxide phase and the cerium dioxide phase from the content ratio of each of the above layers.

FIG. 1 shows a graph obtained by plotting a relationship between the "reduction current amount" and the "content ratio of cerium" (the left end column of Table 1) shown in Table 1.

FIG. 1 shows together the data of compounds containing aluminum; however, these will be described later.

From the graph of FIG. 1, it can be understood that the reduction current value decreases rapidly when the "content ratio of cerium", that is, the content ratio of cerium ions with respect to the sum of the cobalt ions and the cerium ions, exceeds 5% by atom. In other words, the graph shows that the reduction reaction rapidly becomes less likely to occur when the content ratio of cerium ions with respect to the sum of the cobalt ions and the cerium ions exceeds 5% by atom. Further, the reduction current value keeps a low value until the content ratio of the cerium ions reaches 70% by atom where the data are present.

FIG. 2 shows a graph obtained by plotting a relationship between the "specific resistance value" and the "content ratio of cerium" (the left end column of Table 1) shown in Table 1.

FIG. 2 also shows together the data of compounds containing aluminum; however, these also will be described later.

From the graph of FIG. 2, the specific resistance value keeps a low value, which is almost no different from that of the state in which no cerium is added, when the "content ratio of cerium", that is, the content ratio of cerium ions with respect to the sum of the cobalt ions and the cerium ions, is 40% by atom or less. When the content ratio of cerium ions exceeds 40% by atom, the specific resistance value rises once up to 50% by atom, which is a practically sufficiently small value.

Next, FIG. 3 shows a graph obtained by plotting a relationship between the "reduction current amount" and the "abundance ratio of cerium dioxide phase" (the right end column of Table 1) shown in Table 1.

In the graph of FIG. 3 also, in correspondence with the graph of FIG. 1, the reduction current value decreases rapidly when the abundance ratio of cerium dioxide phase exceeds 6.5% by mass corresponding to the content ratio of cerium ions of 5% by atom. In other words, the graph shows that the reduction reaction rapidly becomes less likely to occur when the abundance ratio of the aforesaid cerium dioxide phase with respect to the sum of the cobalt oxyhydroxide phase and the cerium dioxide phase exceeds 6.5% by mass. Further, the reduction current value keeps a low value until the abundance ratio of the aforesaid cerium dioxide phase reaches 88% by mass where the data are present.

Further, FIG. 4 shows a graph obtained by plotting a relationship between the "specific resistance value" and the "abundance ratio of cerium dioxide phase" (the right end column of Table 1) shown in Table 1.

In the graph of FIG. 4 also, in correspondence with the graph of FIG. 2, the specific resistance value keeps a low value, which is almost no different from that of the state in which no cerium is added, when the abundance ratio of cerium dioxide is less than or equal to approximately 49% corresponding to the "content ratio of cerium" of 40% by atom.

Next, as a Comparative Example of the above experiment data, an experiment result with respect to a cobalt compound to which a material other than cerium is added will be shown.

As a material to be added to the cobalt compound, aluminum (Al), manganese (Mn), magnesium (Mg), Yttrium (Y), and iron (Fe) were used.

With respect to each of these materials, a treatment similar to that of the above-described case of cerium was carried out to prepare a compound with cobalt, and measurement of the specific resistance and the reduction current similar to the one described above was carried out. The result thereof is shown in Table 2

TABLE 2

| Added element | Content ratio of added element (% by atom) | Specific resistance value (Ω cm) | Reduction current amount (mAh) |
|---|---|---|---|
| Al | 5 | 8.6 | 15.8 |
| Al | 10 | 23.6 | 13.6 |
| Al | 30 | 124.4 | 10.0 |
| Mn | 30 | 11.2 | 41.5 |
| Mg | 30 | 260.3 | 6.8 |
| Y | 30 | 444.4 | — |
| Fe | 30 | — | 14.5 |

In Table 2, the "content ratio of added element" is a content ratio (% by atom) of the ions of each element with respect to the sum of the cobalt ions and the ions of each element in an aqueous solution containing the cobalt ions and the ions of each element in the production process in the same manner as the "content ratio of cerium" in Table 1. The "specific resistance value" and the "reduction current amount" are similar to those in Table 1.

As shown in Table 2, with respect to aluminum, the "content ratio of added element" is changed in three stages, and the other elements were represented by 30% by atom, so as to grasp the approximate characteristics.

The data on the cobalt compound to which aluminum is added, that is, the cobalt aluminum compounds, in Table 2 are shown together with the cobalt cerium compound in the above-described FIGS. 1 and 2.

When the cobalt cerium compound and the cobalt aluminum compound are compared, the reduction current amount shows a certain tendency of decrease relative to the increase of the aluminum ions though having a considerably higher value than that of the cobalt cerium compound. Therefore, it is expected that, when the content ratio of the aluminum ions is further increased, the reduction current amount can be further decreased.

However, when the cobalt cerium compound and the cobalt aluminum compound are compared in the graph of the specific resistance value of FIG. 2, the specific resistance value increases rapidly in accordance with an increase of the content ratio of aluminum ions. This means that the function as an electronic conductive additive, which is an original object, is considerably deteriorated.

Further, with respect to the other elements in Table 2, with respect to manganese, it is shown that the reduction current amount is large and the reduction resistance is low though having a small value of the specific resistance value; with respect to magnesium or yttrium, the specific resistance value is extremely large; and with respect to iron, the reduction current value is large.

When the cobalt cerium compound is compared with such cobalt compounds to which various elements are added, it can be said that the cobalt cerium compound is a unique existence in view of exhibiting an extremely good value in both of the reduction current amount and the specific resistance value.

On the basis of the above experiment and evaluation, from the viewpoint as a material to be used that requires both reduction resistance and low specific resistance value of an electronic conductive additive or the like used in the positive electrode of an alkaline secondary battery, for example, a cobalt cerium compound containing a cobalt oxyhydroxide phase and a cerium dioxide phase wherein the abundance ratio of the cerium dioxide phase is 6.5% by mass or more and 88% by mass or less with respect to the sum of the cobalt oxyhydroxide phase and the cerium dioxide phase meets such a demand precisely.

Further, in the cobalt cerium compound, the cobalt oxyhydroxide phase and the cerium dioxide phase are preferably present as major components. Specifically, the sum of these two phases is preferably 50% by mass or more, more preferably 75% by mass or more, still more preferably 94% by mass or more, and 98% by mass or more.

As described in FIG. 4, when the abundance ratio of the aforesaid cerium dioxide phase exceeds 49% by mass, the specific resistance value tends to increase and, by evading such a range, the cobalt cerium compound will have a better specific resistance value.

Also, with an electrode containing the above-described cobalt cerium compound and a positive electrode active material, a positive electrode of an alkaline secondary battery using an electronic conductive additive having good characteristics in view of both of the reduction resistance and the low specific resistance can be constructed.

Also, in a method for producing a cobalt cerium compound including a step of depositing a hydroxide containing cobalt and cerium in an aqueous solution containing cobalt ions and cerium ions by changing the pH of the aqueous solution and thereafter performing a treatment of oxidizing the hydroxide, the ratio of the cerium ions contained in the aqueous solution containing the cobalt ions and the cerium ions is preferably set to be 5% by atom or more and 70% by atom or less with respect to the sum of the cobalt ions and the cerium ions before the hydroxide is deposited.

As described in FIG. 2, when the content ratio of the cobalt ions exceeds 40% by atom, the specific resistance value tends to increase and, by evading such a range, the cobalt cerium compound will have a better specific resistance value.

Namely, the cobalt cerium compound according to the present invention is a cobalt compound containing cerium, wherein the first characteristic feature lies in that the abundance ratio of cerium is set to be within a range of 5% by atom or more and 70% by atom or less with respect to the sum of cerium and cobalt.

In the cobalt cerium compound, the abundance ratio of cerium is preferably set to be a value more than 5% by atom with respect to the sum of cerium and cobalt, and the abundance ratio of cerium is more preferably 10% by atom or more with respect to the sum of cerium and cobalt.

Also, in the cobalt cerium compound, the abundance ratio of cerium is preferably 40% by atom or less with respect to the sum of cerium and cobalt.

An alkaline secondary battery according to the present invention has a characteristic feature of having an electrode containing a cobalt cerium compound provided with the above-described first characteristic feature and a positive electrode active material.

Further, it is preferable that the positive electrode active material has a particulate shape, and the cobalt cerium compound is present in a state of being laminated on a surface of the particulate positive electrode active material.

A cobalt cerium compound according to the present invention contains a cobalt oxyhydroxide phase having a crystal structure of rhombohedron structure and space group R3m structure and a cerium dioxide phase having a crystal structure of fluorite structure and space group Fm3m structure, wherein the second characteristic feature lies in that the abundance ratio of the cerium dioxide phase is 6.5% by mass or more and 88% by mass or less with respect to the sum of the cobalt oxyhydroxide phase and the cerium dioxide phase.

When a cobalt cerium compound is added as an electronic conductive additive to a positive electrode active material of an alkaline secondary battery, the cobalt cerium compound will be a compound having a high reduction resistance and being capable of sufficiently performing a function as an electronic conductive additive.

The abundance ratio of the cerium dioxide phase is preferably more than 6.5% by mass with respect to the sum of the cobalt oxyhydroxide phase and the cerium dioxide phase, and is more preferably 13.4% by mass or more with respect to the sum of the cobalt oxyhydroxide phase and the cerium dioxide phase.

Also, the abundance ratio of the cerium dioxide phase is preferably 49% by mass or less with respect to the sum of the cobalt oxyhydroxide phase and the cerium dioxide phase, whereby an electronic conductive additive having a smaller specific resistance value can be provided.

An alkaline secondary battery according to the present invention has a characteristic feature of having an electrode containing a cobalt cerium compound provided with the above-described second characteristic feature and a positive electrode active material.

Further, it is preferable that the positive electrode active material has a particulate shape, and the cobalt cerium compound is present in a state of being laminated on a surface of the particulate positive electrode active material. By using an electronic conductive additive having a high reduction resistance and a small specific resistance value in the positive electrode, the performance of the alkaline secondary battery can be further improved.

A method for producing a cobalt cerium compound according to the present invention is a method for producing a cobalt cerium compound including a step of depositing a hydroxide containing cobalt and cerium in an aqueous solution containing cobalt ions and cerium ions by changing the pH of the aqueous solution and thereafter performing a treatment of oxidizing the hydroxide, wherein the characteristic feature lies in that the ratio of the cerium ions contained in the aqueous solution containing the cobalt ions and the cerium ions is set to be 5% by atom or more and 70% by atom or less with respect to the sum of the cobalt ions and the cerium ions before the hydroxide is deposited.

When a cobalt cerium compound produced by such a production method is added as an electronic conductive additive to a positive electrode active material of an alkaline secondary battery, the cobalt cerium compound will be a compound having a high reduction resistance and being capable of sufficiently performing a function as an electronic conductive additive.

In the method for producing a cobalt cerium compound, the ratio of the cerium ions contained in the aqueous solution containing the cobalt ions and the cerium ions is preferably more than 5% by atom with respect to the sum of the cobalt ions and the cerium ions before the hydroxide is deposited.

Also, the ratio of the cerium ions contained in the aqueous solution containing the cobalt ions and the cerium ions is preferably 10% by atom or more with respect to the sum of the cobalt ions and the cerium ions before the hydroxide is deposited.

Further, the ratio of the cerium ions contained in the aqueous solution containing the cobalt ions and the cerium ions is preferably set to be 40% by atom or less with respect to the sum of the cobalt ions and the cerium ions before the hydroxide is deposited, whereby an electronic conductive additive having a smaller specific resistance value can be provided.

It is preferable to undergo an oxidation treatment after the hydroxide is deposited, and also it is preferable to undergo a step of mixing the aqueous solution containing the cobalt ions and the cerium ions with an aqueous solution adjusted to have a predetermined pH.

Further, the aqueous solution adjusted to have a predetermined pH preferably contains sodium hydroxide, potassium hydroxide, or lithium hydroxide, and the aqueous solution adjusted to have a predetermined pH more preferably contains a particulate positive electrode active material.

Effects of the Invention

As described above, according to the present invention, a compound having a high reduction resistance and being capable of sufficiently performing a function as an electronic conductive additive when added to a positive electrode active material as an electronic conductive additive can be provided.

EMBODIMENTS OF THE INVENTION

Figure 1:
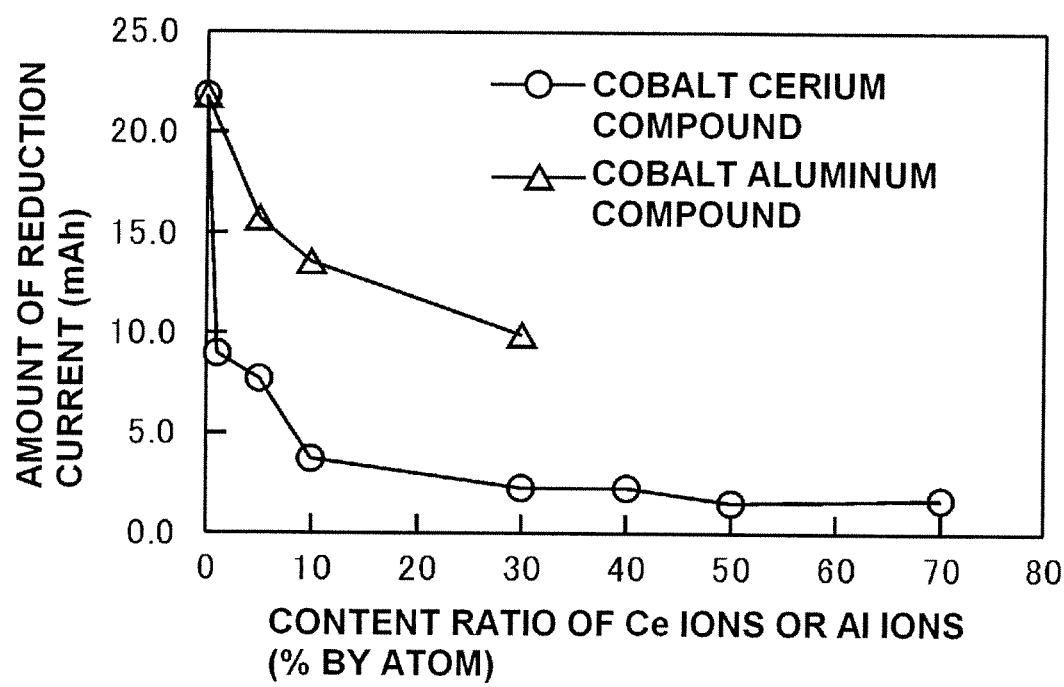
FIG. 1 is a view showing a relationship between the reduction current amount characteristics of the cobalt cerium compound of the present invention and the content ratio of cerium ions.

Hereafter, embodiments of the present invention will be described.
[Preparation of Cobalt Cerium Compound]
A step of producing a cobalt cerium compound will be schematically described.

The cobalt cerium compound is added as an electronic conductive additive to nickel hydroxide; however, there are a technique of adding a cobalt cerium compound to nickel hydroxide after singly preparing the cobalt cerium compound and a technique of integrating a cobalt cerium compound with nickel hydroxide during the process of producing the cobalt cerium compound (specifically, the cobalt cerium compound is deposited on a surface of nickel hydroxide). The latter technique is preferable because the amount of the cobalt cerium compound can be reduced.
[Technique of Singly Preparing a Cobalt Cerium Compound]
First, a technique of singly preparing a cobalt cerium compound will be described.

In this preparation technique, first, a cobalt compound and a cerium compound are dissolved to prepare an aqueous solution containing cobalt ions and cerium ions, and a hydroxide containing cobalt and cerium is deposited in the aqueous solution by adjusting the pH of the aqueous solution.

As a method of adjusting the pH of the aqueous solution containing cobalt ions and cerium ions, a method of dropwise adding the aqueous solution containing the cobalt ions and the cerium ions into an aqueous solution adjusted to have an intended pH. As the pH value, 8 or more, preferably 9 or more and 12 or less can be adopted. As the aqueous solution with adjusted pH, an aqueous solution containing sodium hydroxide, potassium hydroxide, lithium hydroxide, or the like can be used.

A further specific treatment example will be described. An aqueous solution into which cobalt sulfate and cerium nitrate were dissolved at predetermined ratios were dropwise added into a violently agitated NaOH aqueous solution controlled to have a temperature of 45° C. and a pH value of 9. The concentration of the cobalt sulfate and cerium nitrate aqueous solution was set so that the sum of Co atoms and Ce atoms would be 1.6 mol/liter by atom. The pH control during the dropwise addition is carried out by using a 18 wt % NaOH. Filtration, water-washing, and drying yield cobalt cerium hydroxide.

Further, the hydroxide containing cobalt and cerium is subjected to a heating treatment in the presence of oxygen to perform an oxidation treatment, thereby to produce a cobalt cerium compound. As the method of performing an oxidation treatment, a method of heating the hydroxide containing cobalt and cerium in an ambient air can be used.

When this method is used, the hydroxide containing cobalt and cerium is preferably heated in a state of being mixed with an aqueous solution of sodium hydroxide.

This is because sodium has a function of promoting oxidation of cobalt in the hydroxide. Since this function is conspicuously recognized, the mixing amount of the aqueous solution of sodium hydroxide is preferably set so that the atomic ratio (Na/(Co+Ce)) of Na to (Co+Ce) will be 0.5 or more.

As the heating temperature, 60° C. or more and a boiling point of the aqueous solution of sodium hydroxide or less, preferably 100° C. or more, can be used.

As a specific example of oxidation treatment, it is sufficient that 40 g of a 48 wt % NaOH aqueous solution is added to 50 g of cobalt cerium hydroxide, and the mixture is heated in an ambient air at 120° C. for one hour.

Subsequently, filtration, water-washing, and drying yield an intended cobalt cerium compound.

The cobalt cerium compound prepared in this manner can be used as an electronic conductive additive in a form of being mixed with a powder of nickel hydroxide constituting an active material.
[Technique of Depositing a Cobalt Cerium Compound on a Surface of Nickel Hydroxide]
Next, a technique of directly depositing on a surface of nickel hydroxide particles to be used as an active material of an electrode for an alkaline secondary battery will be described. By depositing using this technique, a network of the cobalt cerium compound is formed in the inside of the electrode, so that an electrode for an alkaline secondary battery having a low internal resistance can be obtained, and the amount of use thereof can be greatly reduced.

As the amount of use of the cobalt cerium compound (amount of deposition onto the surface of nickel hydroxide particles), those with 0.1 wt % or more and 10 wt % or less with respect to the sum of the cobalt cerium compound and the nickel hydroxide can be used.

By setting the amount of use to be within this range, an electrode for an alkaline secondary battery having a sufficiently low internal resistance can be obtained. However, this range of the amount of use is applied to a case in which the content ratio of the sum of the cobalt oxyhydroxide phase and the cerium dioxide phase contained in the cobalt cerium compound is 94% by mass (wt %) or more.

For this reason, when the content ratio of the two phases is small, the range of the amount of use is preferably changed to a range containing a larger amount so that the combined amount of the cobalt oxyhydroxide phase and the cerium dioxide phase may be contained to the same degree.

As a method of directly depositing a cobalt cerium compound on a surface of nickel hydroxide particles, a method of performing an oxidation treatment after performing an operation of mixing nickel hydroxide particles into an aqueous solution with adjusted pH and then dropwise adding an aqueous solution containing cobalt ions and cerium ions thereinto can be used.

As a specific preparation example of nickel hydroxide particles serving as an object of depositing the cobalt cerium compound, an aqueous solution containing nickel sulfate dissolved is dropwise added into an aqueous solution of ammonium sulfate having a concentration of 1 mol/liter and controlled to have a pH of 12 and a temperature of 45° C. while being violently agitated. The pH adjustment can be carried out using an 18 wt % NaOH aqueous solution. Subsequently, filtration, water-washing, and drying yield spherical nickel hydroxide particles.

By dropwise adding an aqueous solution containing cobalt ions and cerium ions into the above-mentioned aqueous solution with adjusted pH and mixed with the nickel hydroxide particles, nickel hydroxide particles being in a state in which the hydroxide containing cobalt and cerium is deposited on the surface can be obtained.

As a more specific treatment example, nickel hydroxide particles prepared in the above-described manner are put into a 0.1 mol/liter aqueous solution of ammonium sulfate, and the resultant is violently agitated while adjusting pH to be 9 and controlling the temperature to be 45° C. The pH adjustment is carried out using an 18 wt % NaOH aqueous solution.

Into this solution, an aqueous solution into which cobalt sulfate and cerium nitrate are dissolved at predetermined ratios is dropwise added. The concentration of the cobalt sulfate and cerium nitrate aqueous solution at this time is adjusted so that the sum of Co atoms and Ce atoms will be 1.6 mol/liter by atom.

Also, the amount of the deposit on surface of the nickel hydroxide particles is adjusted so that the amount of Co and Ce contained therein (mass as converted to metal) will be about 4 wt % with respect to the sum amount of the nickel hydroxide, Co, and Ce. Subsequently, filtration, water-washing, and drying yield nickel hydroxide particles coated with a hydroxide containing cerium and cobalt.

When the nickel hydroxide particles in a state in which this hydroxide containing cobalt and cerium is deposited on the surface undergo a subsequent oxidation treatment, nickel hydroxide particles provided with the cobalt cerium compound of the present invention on the surface can be obtained. The oxidation treatment at this time is preferably carried out by heating in a state of being mixed with an aqueous solution of sodium hydroxide in the same manner as in the above-described oxidation treatment. The amount of the aqueous solution of sodium hydroxide that is put to use is preferably mixed so that (Na/(Co+Ce+Ni)) will be 0.5 or more.

As a more specific example of the oxidation treatment, 40 g of a 48 wt % NaOH aqueous solution is added to 50 g of the nickel hydroxide particles in a state in which the hydroxide containing cobalt and cerium is deposited on the surface, and the mixture is heated in an ambient air at 120° C. for one hour. Subsequently, by filtration, water-washing, and drying, the intended active material particles are prepared. By this step, nickel hydroxide particles provided with the cobalt cerium compound on the surface can be obtained. [As to the Content Ratio of Cobalt Ions and Cerium Ions]

A condition for preparing the above-described cobalt cerium compound will be described in further details. In any of the above-described two techniques of preparing a cobalt cerium compound, the characteristics of the cobalt cerium compound changes depending on what content ratio of the cerium ions in the aforementioned aqueous solution containing the cobalt ions and the cerium ions is set.

Specifically, in view of obtaining a cobalt cerium compound having a high reduction resistance, from the above Table 1 and FIG. 1, the reduction current amount can be decreased and the reduction resistance can be improved when the mixing ratio of each material is set so that the ratio of the cerium ions contained in the aforesaid aqueous solution containing the cobalt ions and the cerium ions will be 5% by atom or more or more than 5% by atom with respect to the sum of the cobalt ions and the cerium ions before the aforementioned hydroxide is deposited. Further, a state with a decreased reduction current amount and a high reduction resistance can be brought about with more certainty when the ratio of the cerium ions contained in the aqueous solution will be 10% by atom or more with respect to the sum of the cobalt ions and the cerium ions.

Also, as to the upper limit value of the ratio of cerium ions contained in the aforesaid aqueous solution containing the cobalt ions and the cerium ions, it is difficult to define the upper limit value because all of the data on the side at which the content ratio of cerium ions is high are good both in the reduction resistance (the smallness of the reduction current) and in the smallness of the specific resistance value. However, it can be confirmed that the cobalt cerium compound has a high reduction resistance at least up to the highest content ratio among the obtained data.

In other words, it has been confirmed that the cobalt cerium compound has a high reduction resistance when the ratio of the cerium ions contained in the aforesaid aqueous solution containing the cobalt ions and the cerium ions is set to be 5% by atom or more or more than 5% by atom and 70% by atom or less with respect to the sum of the cobalt ions and the cerium ions before the aforementioned hydroxide is deposited.

Figure 2:
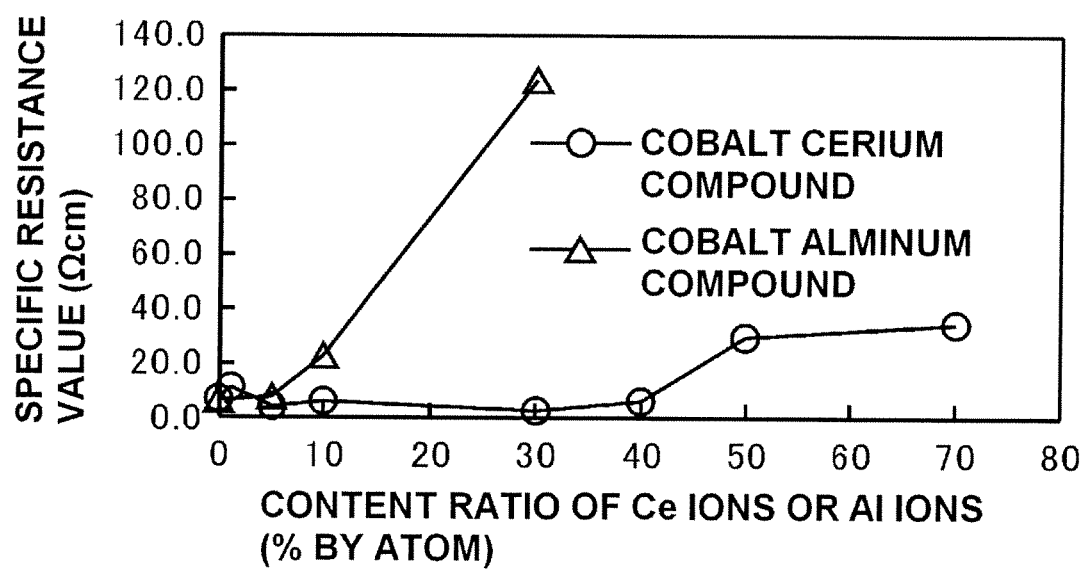
FIG. 2 is a view showing a relationship between the specific resistance value of the cobalt cerium compound of the present invention and the content ratio of cerium ions.
Figure 3:
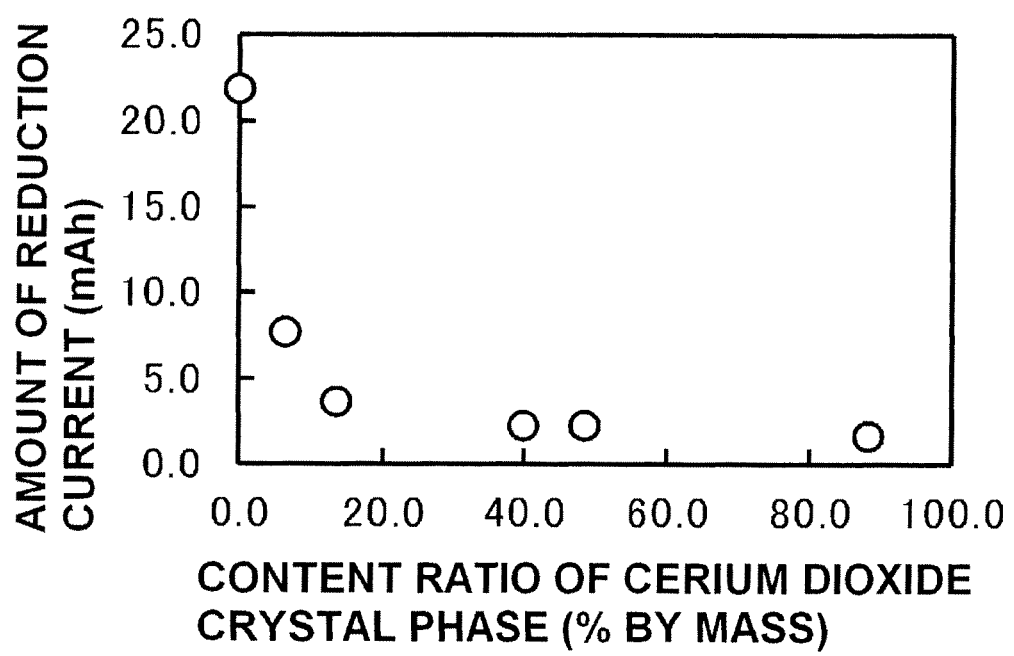
FIG. 3 is a view showing a relationship between the reduction current characteristics of the cobalt cerium compound of the present invention and the abundance ratio of the cerium dioxide phase.
Figure 4:
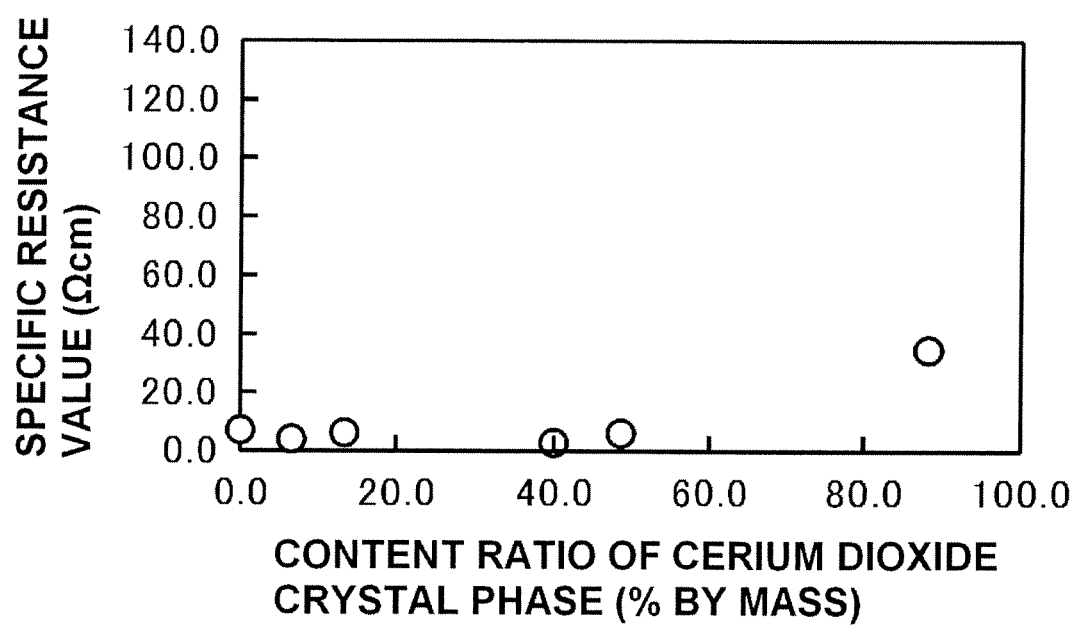
FIG. 4 is a view showing a relationship between the specific resistance value of the cobalt cerium compound of the present invention and the abundance ratio of the cerium dioxide phase.
Figure 5:
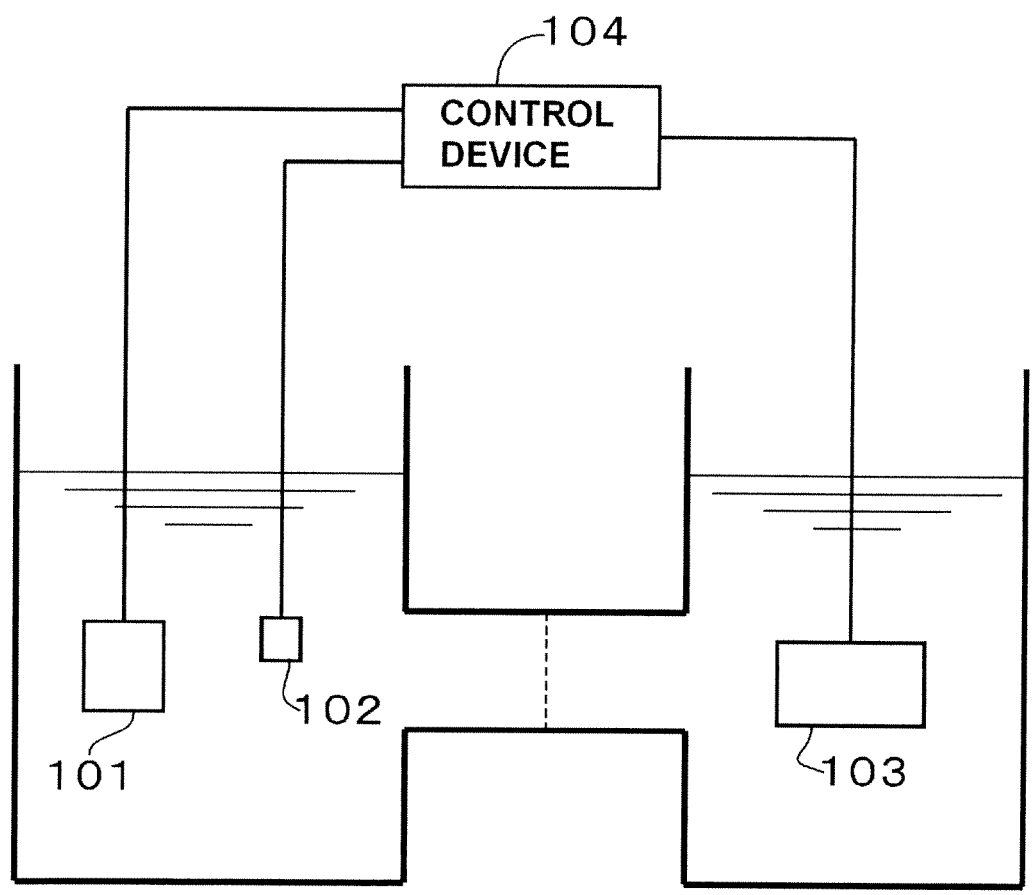
FIG. 5 is a view showing an apparatus for evaluating the cobalt cerium compound of the present invention.
Figure 6:
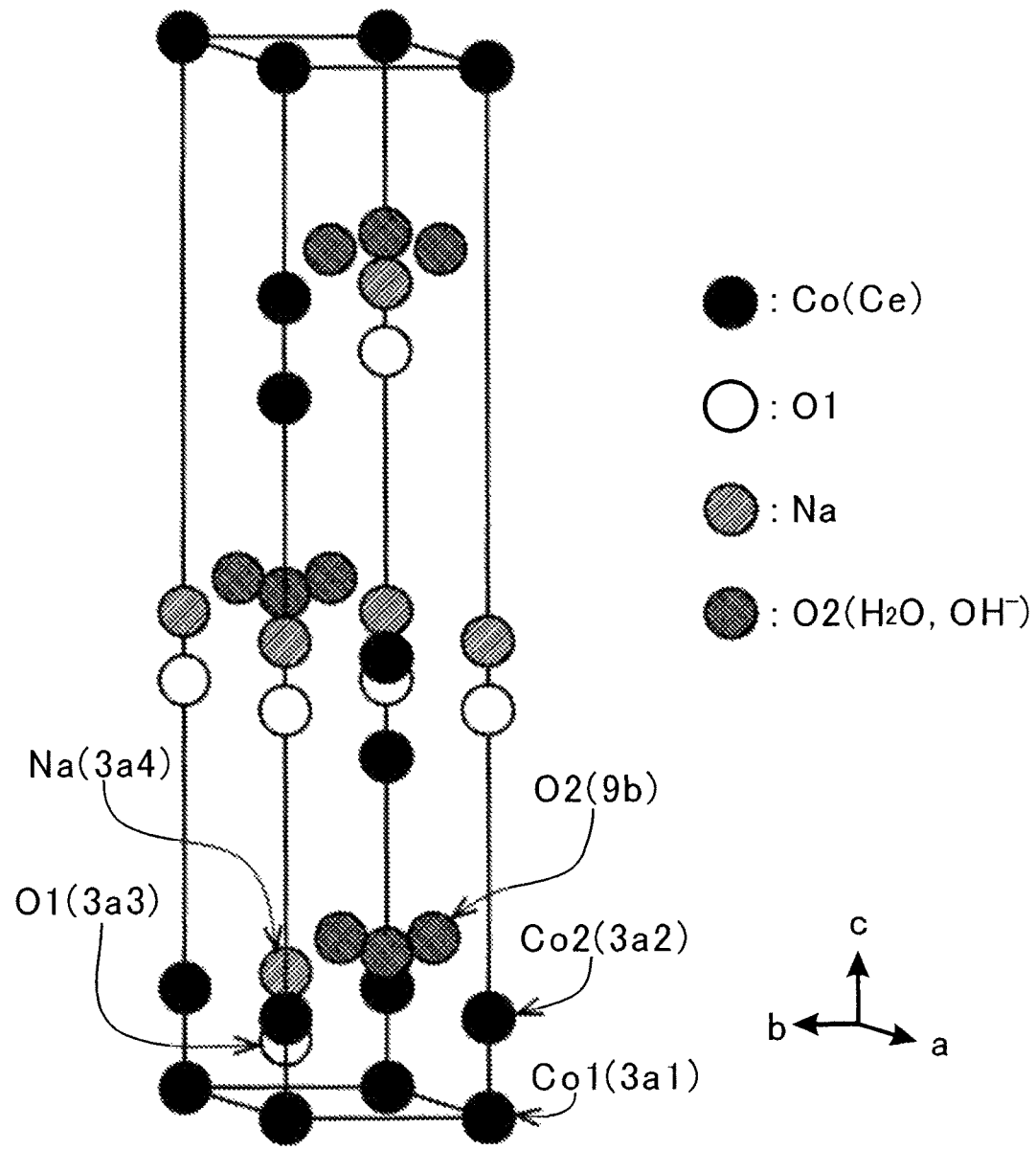
FIG. 6 is a view showing a crystal structure model of the cobalt oxyhydroxide phase constituting a part of the cobalt cerium compound of the present invention.
Figure 7:
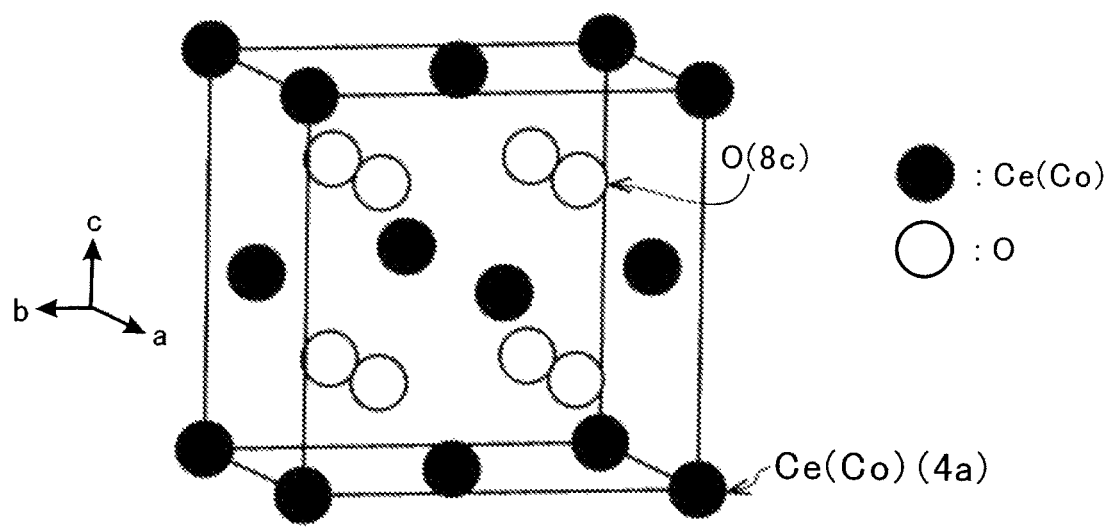
FIG. 7 is a view showing a crystal structure model of the cerium dioxide phase constituting a part of the cobalt cerium compound of the present invention.

When the ratio of the cerium ions contained in the aforesaid aqueous solution is seen from the viewpoint of the specific resistance value of the prepared cobalt cerium compound, from the above Table 1 and FIG. 2, the value of the specific resistance value is basically a good value in any of the ranges of the ratio of the cerium ions that are set as described above.

However, when the change in the specific resistance value of FIG. 2 is seen in further details, the specific resistance value shows a tendency of increase when the content ratio of the cerium ions with respect to the sum of the cobalt ions and the cerium ions exceeds 40% by atom. Therefore, a cobalt cerium compound having especially good characteristics in view of reducing the specific resistance value as much as possible can be prepared when the ratio of the cerium ions contained in the aforesaid aqueous solution containing the cobalt ions and the cerium ions is set to be more than 5% by atom and 40% by atom or less with respect to the sum of the cobalt ions and the cerium ions before the aforementioned hydroxide is deposited.

As a result of analyzing the crystal structure, the cobalt cerium compound prepared under the above-described condition contains a cobalt oxyhydroxide phase having a crystal structure of rhombohedron structure and space group R3m structure (abbreviated as "cobalt oxyhydroxide phase" at appropriate times) and a cerium dioxide phase having a crystal structure of fluorite structure and space group Fm3m structure (abbreviated as "cerium dioxide phase" at appropriate times) as major components, and also a little amount of tricobalt tetraoxide crystal phase depending on the condition for preparing the cobalt cerium compound, as described above.

The ratio of the cerium ions in the aqueous solution containing the cobalt ions and the cerium ions prepared in the step of producing the cobalt cerium compound (strictly speaking, the content ratio of the cerium ions with respect to the sum of the cobalt ions and the cerium ions) and the abundance ratio of the aforesaid cerium dioxide phase (strictly speaking, the abundance ratio of the aforesaid cerium dioxide phase with respect to the sum of the aforesaid cobalt oxyhydroxide phase and the aforesaid cerium dioxide phase) are in a correlative relationship and approximately have a proportional relationship.

When the cobalt cerium compound is prepared by setting the mixing ratio of each material so that the ratio of the cerium ions contained in the aforesaid aqueous solution containing the cobalt ions and the cerium ions will be more than 5% by atom with respect to the sum of the cobalt ions and the cerium ions, the abundance ratio of the aforementioned cerium dioxide phase with respect to the sum of the aforementioned cobalt oxyhydroxide phase and the aforementioned cerium dioxide phase will be 6.5% by mass or more or more than 6.5% by mass. When the cobalt cerium compound is prepared by setting the ratio of the cerium ions contained in the aforesaid aqueous solution containing the cobalt ions and the cerium ions to be 70% by atom or less with respect to the sum of the cobalt ions and the cerium ions, the abundance ratio of the aforementioned cerium dioxide phase with respect to the sum of the aforementioned cobalt oxyhydroxide phase and the aforementioned cerium dioxide phase will be 88% by mass or less.

Further, when the cobalt cerium compound is prepared by setting the mixing ratio of each material so that the ratio of the cerium ions contained in the aforesaid aqueous solution containing the cobalt ions and the cerium ions will be 10% by atom or more with respect to the sum of the cobalt ions and the cerium ions, the abundance ratio of the aforementioned cerium dioxide phase with respect to the sum of the aforementioned cobalt oxyhydroxide phase and the aforementioned cerium dioxide phase will be 13.4% by mass or more.

When the cobalt cerium compound is prepared by setting the ratio of the cerium ions contained in the aforesaid aqueous solution containing the cobalt ions and the cerium ions to be more than 5% by atom and 40% by atom or less with respect to the sum of the cobalt ions and the cerium ions in view of reducing the specific resistance value of the cobalt cerium compound as much as possible, the abundance ratio of the aforementioned cerium dioxide phase with respect to the sum of the aforementioned cobalt oxyhydroxide phase and the aforementioned cerium dioxide phase will be 6.5% by mass or more or more than 6.5% by mass and 49% by mass or less.

Further, in setting the ratio of the cerium ions contained in the aforesaid aqueous solution containing the cobalt ions and the cerium ions, it is also preferable to pay attention to a material cost for preparing the cobalt cerium compound.

When the prices of cobalt and cerium are compared, cobalt is far more expensive, so that it is desirable to set the ratio of use of cerium to be as large as possible in view of the material cost.

In FIG. 2, in the case of a cobalt aluminum compound, the specific resistance value will be more than the maximum specific resistance value of the cobalt cerium compound when the content ratio of aluminum ions exceeds 12.5% by atom. Therefore, it will be advantageous over the cobalt aluminum compound also in terms of the material cost when the ratio of the cerium ions contained in the aforesaid aqueous solution containing the cobalt ions and the cerium ions is set to be 15% by atom or more or 20% by atom or more with respect to the sum of the cobalt ions and the cerium ions.

[Production of a Positive Electrode for an Alkaline Secondary Battery]

Next, a process of preparing a positive electrode for an alkaline secondary battery (more specifically a nickel hydrogen battery) will be schematically described.

An aqueous solution of carboxymethylcellulose (CMC) or the like is added to a mixture of nickel hydroxide and a cobalt cerium compound prepared by any of the above-described two preparation techniques, namely, a technique of singly preparing a cobalt cerium compound and thereafter adding the cobalt cerium compound to a nickel hydroxide powder and a technique of depositing a cobalt cerium compound on a surface of nickel hydroxide, so as to form a paste.

A substrate having an electron conductivity such as a porous nickel substrate (nickel foamed substrate) is filled with this paste and the resultant is thereafter subjected to a drying treatment and pressed to a predetermined thickness to form a positive electrode for an alkaline secondary battery.

[Production of an Alkaline Secondary Battery]

Next, a step in the case of producing a nickel hydrogen battery as an alkaline secondary battery will be schematically described. Here, a detailed description of welding or the like of each section will be omitted.

A paste containing a hydrogen absorption alloy powder as a major component is applied onto a negative electrode base plate made of a punching steel plate in which iron is plated with nickel, and the resultant is dried and thereafter pressed to a predetermined thickness to prepare a negative electrode.

This negative electrode, a separator made of a non-woven cloth of polypropylene, and the above-described positive electrode are laminated, and the obtained laminate is wound in a roll form.

After a positive electrode electricity-collecting plate and a negative electrode electricity-collecting plate are attached to this, the resultant is inserted into a tubular can body having a bottom, and an electrolyte solution is injected.

Thereafter, a disk-shaped lid body having a ring-shaped gasket attached to the perimeter thereof and provided with a cap-shaped terminal or the like is mounted in a state of being in electrical contact with the positive electrode electricity-collecting plate and is fixed by caulking the open end of the aforesaid can body.

[Characteristics Evaluation as an Alkaline Secondary Battery]

Next, in order to verify the characteristics of an alkaline secondary battery to which the present invention is applied, the alkaline secondary battery was prepared by the above-described production method, and also a sample for comparison to which the present invention was not applied was prepared, and a discharge recovery capacity after over-discharging was measured with respect to these. This measurement examines to what degree the performance as a battery can be maintained when the alkaline secondary battery is brought into an over-discharged state to bring the battery into a state in which the cobalt oxyhydroxide is liable to be reduced.

First, a specific condition for preparing a measurement sample of an alkaline secondary battery to which the present invention is applied will be described.

Preparation of a cobalt cerium compound was carried out by using the above-described technique of depositing a cobalt cerium compound on the surface of nickel hydroxide. Specific conditions for preparation of nickel hydroxide particles, deposition of the hydroxide containing cobalt and cerium onto the nickel hydroxide particles, and treatment of oxidation thereof were set to be the same as those described as a specific treatment example for each treatment. However, the ratio of cobalt sulfate and nickel nitrate in the aqueous solution of cobalt sulfate and nickel nitrate in the step of depositing the hydroxide containing cobalt and cerium onto the nickel hydroxide particles was set to be 7:3.

Also, regarding the amount of the cobalt cerium compound deposited on the nickel hydroxide particles, the amount of Co and Ce (mass as converted to metal) contained in this compound was 4 wt % with respect to the sum of the mass of the nickel hydroxide particles and the mass of Co and Ce (mass as converted to metal).

The nickel hydroxide particles provided with this cobalt cerium compound on the surface and an aqueous solution containing carboxymethylcellulose (CMC) at a concentration of 1 wt % were added and kneaded, and then polytetrafluoroethylene (PTFE) was mixed thereinto to form a paste. The ratio at this time was set to be the nickel hydroxide particles provided with the cobalt cerium compound on the surface PTFE (solid components)=97:3.

A foamed nickel base plate having a thickness of 1.4 mm and a surface density of 450 $g/m^2$ was filled with the positive electrode paste and subjected to rolling after being dried to prepare an original plate. The original plate was cut to a dimension of 4 cm×6 cm.

Also, the plate was filled with the nickel hydroxide provided with the cobalt cerium compound on the surface so that the electrode capacity of the plate having this dimension would be 500 mAh. With this plate used as a positive electrode and a hydrogen absorption alloy electrode used as a negative electrode, a separator was allowed to intervene to constitute an open-type cell. As the electrolyte solution, a 6.8 mol/liter aqueous solution of potassium hydroxide was used.

[Preparation of a Sample for Comparison]

For comparison with an alkaline secondary battery to which the present invention was applied, nickel hydroxide particles provided with cobalt oxyhydroxide on the surface were prepared as a sample for comparison. First, nickel hydroxide particles were prepared. Into an aqueous solution with adjusted pH and mixed with this, an aqueous solution containing cobalt was dropwise added to prepare nickel hydroxide particles having cobalt hydroxide deposited on the surface thereof.

The specific conditions were set to be the same as in the case of the measurement sample to which the present invention was applied, except that the aqueous solution did not contain cerium ions. In other words, an aqueous solution of cobalt sulfate was used instead of the aqueous solution of cobalt sulfate and cerium nitrate.

Subsequently, the cobalt hydroxide deposited on the surface of the nickel hydroxide particles was subjected to an oxidation treatment to obtain nickel hydroxide particles provided with cobalt oxyhydroxide on the surface. The method of oxidation treatment was carried out under the same condition as that of the measurement sample to which the present invention was applied. Regarding the amount of the cobalt oxyhydroxide, the amount of Co (mass as converted to metal) contained in this compound was 4 wt % with respect to the sum of the mass of the nickel hydroxide particles and the amount of Co (mass as converted to metal).

With respect to this sample for comparison as well, an open-type cell was prepared in the same manner as the above-described measurement sample to which the present invention was applied.

[Test Condition]

With respect to the measurement sample to which the present invention was applied and the sample for comparison to which the present invention was not applied, a step of charging at a charging current of 1.0 C for 15 hours and, after a rest of one hour, discharging at a discharging current of 1.0 C with the finishing voltage set at 0.0 V was repeated under a temperature environment of 20° C., so as to examine the discharging capacity at the 10th cycle (discharge capacity before connection of a constant resistor). Thereafter, the cells were charged at a charging current of 0.1 C for 15 hours and, after a rest of one hour, discharged at a discharging current of 0.2 C with the finishing voltage set at 0.0 V under a temperature environment of 20° C. to set the cells to the final period of discharging. To these cells in this state, a constant resistor was connected between the positive and negative electrodes for 3 days under an environment of 60° C. By this operation, a so-called over-discharged state is reproduced, and the potential of the positive electrode provided with the cobalt cerium compound is set to be approximately the same potential as that of the negative electrode. Thereafter, these cells were charged at a charging current of 0.1 C for 15 hours and, after a rest of one hour, discharged at a discharging current of 0.2 C with the finishing voltage set at 0.0 V again under a temperature environment of 20° C., so as to examine the discharge recovery capacity after connection of the constant resistor (the discharge recovery capacity after over-discharging).

[Test Results]

As a result of the test under the aforementioned test condition, the discharge recovery capacity was 85.4% in the measurement sample to which the present invention was applied, as represented by a relative index in the case in which the discharge capacity before connection of a constant resistor was assumed to be 100, whereas the discharge recovery capacity was 73.3% in the sample for comparison to which the present invention was not applied.

Therefore, it will be understood that the nickel hydroxide particles provided with the cobalt cerium compound of the present invention on the surface is an active material excellent in the over-discharge resistance.

[Other Embodiments]

In the above-described embodiments, a nickel hydrogen battery was exemplified as an alkaline secondary battery to which the present invention is applied; however, the present invention can be applied to production of various alkaline storage batteries such as a nickel cadmium battery.

DESCRIPTION OF THE SYMBOLS

101 working electrode
102 reference electrode
103 counter electrode
104 control device

The invention claimed is:

1. An alkaline secondary battery, comprising:
   an electrode comprising a cobalt cerium compound and a positive electrode active material,
   wherein the cobalt cerium compound comprises a cobalt oxyhydroxide phase and a cerium dioxide phase,
   wherein an abundance ratio of cerium in the cobalt cerium compound is set to be within a range of 5% by atom or more and 70% by atom or less with respect to a sum of cerium and cobalt,
   wherein the cobalt oxyhydroxide phase includes a rhombohedral structure and a space group R3m structure, and a portion of cobalt of the cobalt oxyhydroxide phase is substituted by cerium, and
   wherein the cerium dioxide phase includes a crystal structure of a fluorite structure and a space group Fm3m structure, and a portion of cerium of the cerium dioxide phase is substituted by cobalt.

2. The alkaline secondary battery according to claim 1, wherein the abundance ratio of cerium is set to be a value more than 5% by atom with respect to the sum of cerium and cobalt.

3. The alkaline secondary battery according to claim 1, wherein the abundance ratio of cerium is 10% by atom or more with respect to the sum of cerium and cobalt.

4. The alkaline secondary battery according to claim 1, wherein the abundance ratio of cerium is 40% by atom or less with respect to the sum of cerium and cobalt.

5. The alkaline secondary battery according to claim 1, wherein said positive electrode active material has a particulate shape, and the cobalt cerium compound is present in a state of being laminated on a surface of said positive electrode active material with the particulate shape.

6. The alkaline secondary battery according to claim 1, wherein, in the cobalt cerium compound, an abundance ratio of a cerium dioxide phase is within a range of 6.5% by mass or more and 88% by mass or less with respect to a sum of the cobalt oxyhydroxide phase and the cerium dioxide phase.

* * * * *